United States Patent Office 3,220,991
Patented Nov. 30, 1965

3,220,991
HEAT STABILIZATION OF POLYVINYL ALCOHOL WITH ALIPHATIC POLYCARBOXYLIC ACID
Joseph G. Martins, Ludlow, Mass., assignor, by mesne assignments, to Monsanto Company, a corporation of Delaware
No Drawing. Filed Mar. 28, 1962, Ser. No. 183,060
5 Claims. (Cl. 260—91.3)

This invention relates to the preparation of heat stable polyvinyl alcohol. More particularly, it relates to the heat stabilization of polyvinyl alcohol by the incorporation of certain aliphatic polycarboxylic acids in the resin.

Polyvinyl alcohol, it is well known, is usually prepared by the alkaline hydrolysis of a suitable polyvinyl ester rather than by the direct polymerization of the vinyl alcohol monomer, a compound too unstable for independent existence. Alkaline hydrolysis, although more efficient in many ways than acid hydrolysis, is unfortunately attended by the formation of color, a phenomenon which renders the resulting resin more or less unacceptable for many potential applications. Several methods have been proposed to restore this useful resin to its contemplated applications and these methods have been by and large successful. However, a problem remains. If a colorless polyvinyl alcohol be subjected to moderate heat for a certain period, say for instance 150° C. for 30 minutes, it will without further treatment develop a significant amount of color. This color may range from deep yellow to dark brown. It arises in an unknown manner in the course of the decomposition of the resin, a process which probably involves oxidation, chain splitting, crosslinking, dehydration and so on. While the appearance of color is in itself a phenomenon to be avoided, it is also accompanied as may well be imagined by other serious changes in the resins properties such as, to name a few, decrease in flexibility, loss of ability to elongate, embrittlement and alteration of solubility characteristics.

It is, therefore, an object of this invention to prepare a polyvinyl alcohol with great inherent resistance to color producing thermal degradation.

This has been achieved by the neutralization of vinyl ester polymer hydrolyzates with an alcohol soluble aliphatic polycarboxylic acid containing from 4–6 carbon atoms and from 0–4 hydroxyl groups. The improvement derived from this treatment may be demonstrated by heating the resin at an elevated temperature, e.g., 150° C. for forty five minutes, and observing the formation of color. The effect of neutralization with these acids as opposed to that of neutralization with a commonly employed acid such as acetic acid, or for that matter, of no neutralization at all, will be vivid.

How this critical neutralization step is accomplished will be described presently. With respect to the particular resins used in the following examples, it should be noted that they have been selected only to illustrate the larger class of polyvinyl alcohols that may be benefited by this invention. That class will be defined later.

*Example 1*

A methanol solution of polyvinyl acetate weighing 200 g. and containing 47% by weight of a polyvinyl acetate resin having a viscosity of 10 centipoises in benzene at 20° C. (86 g./l.), was intimately mixed at 46° C. with 6 ml. of a 3.9% sodium hydroxide solution in methanol. The mixture was vigorously agitated for two minutes. A gel structure formed after 8 minutes. The gel was chopped finely and at the end of a period of one hour from the original contact of the hydrolyzing agent and the resin solution, the gel was steeped in a solution of 0.8 g. citric acid in 200 ml. methanol. After a few minutes stirring, the liquors were drained and the resin was washed with five consecutive portions of 150 ml. methanol. The resulting polyvinyl alcohol was dried in an air oven at 70° C.

After heating the resinous product to 145° C. for 45 minutes, it was found to be still water soluble as well as negligibly colored. An aliquot of the alkaline hydrolyzate not subjected to the citric acid neutralization exhibited, upon the same heat treatment, severe degradation in that the resulting dark brown material was found to be only partially soluble in water.

The citric acid neutralized polyvinyl alcohol had a viscosity of 9 centipoises as a 4% solution in water at 20° C. and contained 16.9% by weight of polyvinyl acetate as determined by saponification.

*Example 2*

To 100 lbs. of 48.7% solution of polyvinyl acetate in methanol was added with stirring 1300 ml. 4% by weight solution of sodium hydroxide in methanol. After stirring 3 minutes, a gel formed in 6.5 minutes and was chopped up at 20 minutes. At the end of 32 minutes, the chopped resin was suspended in 100 lbs. methanol and 174 g. citric acid in 1740 ml. methanol was used to neutralize the mixture. After standing for 30 minutes, the mixture was drained and the solids washed five times with 60 lbs. methanol. The washed polyvinyl alcohol was then dried in an air oven at 70° C. for 16 hours.

The resulting resin exhibited a viscosity of 11 centipoises at 20° C. as a 4% by weight aqueous solution and contained 24% by weight residual acetate groups calculated as polyvinyl acetate. Upon exposure to heat at 145° C. for 50 minutes, only an insignificant trace of yellow color was present and the solubility of the resin in water was not affected.

The original polyvinyl acetate has a viscosity of 15 centipoises in benzene at 20° C. (86 g./l.).

*Examples 3–7*

Alkaline hydrolyzates were prepared in the quantities, with the materials and according to the directions of Example 1. The neutralization, however, was carried out with acids other than the citric acid used in that example. Each batch was washed five times with methanol in the usual manner in order to remove excess acid from the resinous solids. These variations and their effects on the ability of polyvinyl alcohol to resist exposure to heat are tabulated as follows:

| Example | Neutralizing Acid | Resin Properties After Heat Treatment (145° C.—45 min.) | |
|---|---|---|---|
| | | Color | Solubility in water |
| 3 | 0.48 g. itaconic | Pale yellow | Soluble. |
| 4 | 0.50 g. adipic | ___do___ | Do. |
| 5 | 0.50 g. malic | Very pale yellow | Do. |
| 6 | 0.62 g. tartaric | Negligible | Do. |
| 7 | 0.30 g. acetic | Dark amber | Partly insoluble. |

On examination of these results, it becomes evident that while weak polycarboxylic acids will significantly improve the heat stability of polyvinyl alcohol, such improvement is maximized by the presence of hydroxyl groups on the acid molecule.

*Example 8*

To 63 g. of a 3:1 copolymer of vinyl acetate and dimethyl fumarate in 250 ml. methanol was added 4 ml. of a 3.9% by weight solution of sodium hydroxide in methanol. After one hour, the gel obtained was chopped and steeped in 150 ml. methanol containing 0.5 g. citric acid. The resin was then drained and washed with five consecutive portions of methanol. After drying at 70° C., the resin was exposed to a temperature of 145° C. for 45 minutes. Color formation resulting from this treatment was again found negligible.

The polymers which can benefit from this invention belong to the general class of partially to completely hydrolyzed polyvinyl ester homopolymers as well as partially to completely hydrolyzed polyvinyl ester copolymers made up of either different vinyl ester monomers or of a vinyl ester monomer and another compatible vinyl monomer which is not a vinyl ester. This will be illustrated presently. These polyvinyl alcohols or hydrolyzed polyvinyl esters should have at least 20% of their ester groups hydrolyzed off and possess a molecular weight average within the range of 1,200 to 125,000.

For example, useful polyvinyl alcohols are those obtained by the hydrolysis of 20–100% of the ester groups of homopolymers of monomers such as vinyl acetate, vinyl propionate, vinyl butyrate, vinyl hexoate, vinyl benzoate and others. As typical of the useful terpolymer type of vinyl alcohol which is obtained by the partial hydrolysis of vinyl ester copolymers, there are included copolymers of a vinyl ester with other vinyl esters such as vinyl acetate, vinyl propionate, vinyl butyrate, vinyl hexoate, vinyl stearate, and the like; copolymers of a vinyl ester with a vinyl halide such as vinyl chloride and vinyl bromide; copolymers of a vinyl ester with the lower alkyl esters of acrylic acid such as methyl acrylate, ethyl acrylate, propyl acrylate, butyl acrylate, hexyl acrylate, ethylhexyl acrylate, octyl acrylate and the like; copolymers of a vinyl ester with the lower alkyl esters of methacrylic acid such as methyl, propyl, butyl, hexyl, octyl methacrylates and the like; copolymers of a vinyl ester with monoethylenically unsaturated carboxylic acids such as acrylic, methacrylic, crotonic acids and the like; copolymers of a vinyl ester with other ethylenic monomers such as ethylene, propylene, isobutylene and others. All these useful vinyl alcohol polymers are well known and methods for their preparation are readily available.

The process of this invention is especially applicable to water soluble polyvinyl alcohols formed by the direct hydrolysis of the vinyl ester polymers and copolymers just enumerated. These preferred water soluble polyvinyl alcohols may retain from 0 to 45% of their original ester groups and may have a viscosity ranging from 3 to 65 centipoises as 4% solutions in water at 20° C. It should be noted, however, that the water solubility of such polymers is in addition to the two factors just mentioned, i.e., degree of hydrolysis and molecular size as indicated by viscosity, affected by the nature of the remaining ester groups. If such groups be benzoates or stearates, for instance, much less than 45% of them must remain in the polyvinyl alcohol molecule if the latter is to be water soluble. An especially preferred class of polyvinyl alcohols is afforded by the completely or partially hydrolyzed polymers of vinyl acetate by reason of the commercial availability of such materials. These preferred polymers may contain from 0–45% by weight of unhydrolyzed acetate groups calculated as polyvinyl acetate. Methods to prepare such polymers are found in U.S. Patents 2,502,715 and 2,643,994.

The acids that may be used in the practice of this invention are in general characterized as follows: they are 4 to 6 carbon aliphatic molecules containing at least two carboxyl groups and also, preferably, some hydroxyl groups. These compounds must in addition be soluble in the lower alkyl alcohols, e.g., methanol and ethanol, at ordinary temperatures.

Usable acids include: aconitic acid, adipic acid, citraconic acid, glutaric acid, β-hydroxyglutaric acid, isosaccharic acid, itaconic acid, isocitric acid, methyl glutaric acid, succinic acid, tartronic acid and the like. Among the preferred class of acids are such as citric acid, malic acid and tartaric acid.

The amount of acid to be used depends of course on the amount of alkaline catalyst such as sodium hydroxide employed as hydrolyzing reagent. In general from one to two equivalents of acid should be added. This actual amount needed in a particular case can readily be determined by measuring the pH of the washes which ultimately should be approximately neutral. These washings, a critical part of the process herein disclosed, should be carried out with either methanol or ethanol. This treatment will serve to remove not only excess acid but also other salt by-products of the hydrolysis such as sodium acetate; it will serve further to leave an intimately mixed blend of a substantial portion of the salt formed by the neutralization with the particular acid used.

The processing of polyvinyl alcohol by the method disclosed in this invention does not preclude the addition of the variety of useful ingredients which are known to improve the properties of this polymer. Among the types of materials which may be added to the resin along with the alkali metal organic acid salts of this invention are plasticizers, anti-oxidants, fungicides, and so on, depending on the prospective use of the resin. The acid treated resin containing the appropriate additives can be employed in conventional manner, i.e., can undergo such transformation as molding, extrusion and so on. Advantageous, however, is the fact that a greater working temperature range is now permissible for the use of the resin either during its transformation or in its ultimate applications.

What is claimed is:

1. A process to heat stabilize polyvinyl alcohol resins prepared by hydrolysis of vinyl acetate polymers with an alkaline hydrolysis catalyst, said polyvinyl alcohol having a molecular weight of 1,200 to 125,000 and 0 to 80% by weight of residual acetate groups calculated as polyvinyl acetate, said process comprising neutralizing said polyvinyl alcohol by steeping in a solution of an alcohol soluble aliphatic polycarboxylic acid, containing from 4 to 6 carbon atoms, dissolved in a liquid consisting of a member selected from the group consisting of methyl alcohol and ethyl alcohol, removing said acid solution, and washing the polyvinyl alcohol with a liquid consisting of a member selected from the group consisting of methyl alcohol and ethyl alcohol, until the washes are neutral, the amount of polycarboxylic acid used is chemically equivalent to 100–200% of the alkaline catalyst.

2. The process of claim 1 wherein the polyvinyl alcohol is a water soluble resin containing 0 to 45% by weight of residual acetate groups calculated as polyvinyl acetate and having a viscosity within the range of 3 to 65 centipoises as a 4% aqueous solution at 20° C.

3. The process of claim 1 wherein the neutralized polyvinyl alcohol is washed at least five times with the liquid selected.

4. The process of claim 1 wherein the polycarboxylic acid contains up to 4 hydroxyl groups.

5. The process of claim 4 wherein the polycarboxylic acid is citric acid.

References Cited by the Examiner

UNITED STATES PATENTS

| | | | |
|---|---|---|---|
| 2,169,250 | 8/1939 | Izard | 260—91.3 XR |
| 2,266,996 | 12/1941 | Scott et al. | 260—91.3 XR |
| 2,379,309 | 6/1945 | Malm et al. | 260—91.3 XR |
| 2,496,480 | 2/1950 | Lavin et al. | 260—91.3 |
| 2,643,994 | 6/1953 | Germain | 260—91.3 |
| 2,796,413 | 6/1957 | Baer | 261—91.3 XR |

WILLIAM H. SHORT, *Primary Examiner.*

LOUISE P. QUAST, *Examiner.*